US012715704B1

(12) United States Patent
Scholla et al.

(10) Patent No.: US 12,715,704 B1
(45) Date of Patent: Aug. 25, 2026

(54) WELLSITE PROPPANT STORAGE AND TRANSPORT SYSTEMS AND METHODS

(71) Applicant: Atlas Sand Company, LLC, Austin, TX (US)

(72) Inventors: Christopher R. Scholla, Austin, TX (US); William Warner, Austin, TX (US); Alexander Ellerbusch, Austin, TX (US)

(73) Assignee: Atlas Sand Company, LLC, Austin, TX (US)

( * ) Notice: Subject to any disclaimer, the term of this patent is extended or adjusted under 35 U.S.C. 154(b) by 0 days.

(21) Appl. No.: 19/334,388

(22) Filed: Sep. 19, 2025

Related U.S. Application Data

(63) Continuation of application No. 19/299,722, filed on Aug. 14, 2025.

(51) Int. Cl.
*B65G 33/14* (2006.01)
*B65G 15/10* (2006.01)

(52) U.S. Cl.
CPC ............. *B65G 33/14* (2013.01); *B65G 15/10* (2013.01); *B65G 2201/045* (2013.01)

(58) Field of Classification Search
None
See application file for complete search history.

(56) References Cited

U.S. PATENT DOCUMENTS

| | | | | |
|---|---|---|---|---|
| 1,858,760 | A * | 5/1932 | Akervick | B66D 1/26 192/17 R |
| 2,568,434 | A * | 9/1951 | Dunasky | B65G 65/00 198/530 |
| 5,317,859 | A * | 6/1994 | Schneider | B65B 5/106 53/251 |
| 7,090,066 | B2 * | 8/2006 | Kirsch | B65G 47/18 414/572 |
| 10,584,003 | B2 * | 3/2020 | Friesen | B65G 47/44 |
| 10,633,174 | B2 * | 4/2020 | Pham | B65D 88/32 |
| 10,710,811 | B2 * | 7/2020 | Igoe | B65G 41/002 |
| 11,780,689 | B1 * | 10/2023 | Brenden | B65G 41/002 414/398 |
| 11,975,930 | B2 * | 5/2024 | Koehl | B65G 67/24 |
| 12,065,322 | B2 * | 8/2024 | Brunone | B65G 19/04 |
| 12,077,372 | B2 * | 9/2024 | Grimes | B65G 3/04 |
| 12,221,299 | B1 * | 2/2025 | Weinstein | B65G 41/008 |

OTHER PUBLICATIONS

Description of Applicant-Admitted Prior Art on attached single page.

* cited by examiner

*Primary Examiner* — Kavel Singh
(74) *Attorney, Agent, or Firm* — Norton Rose Fulbright US LLP

(57) ABSTRACT

A system of storing and transporting sand at a wellsite is provided. In a first aspect, the system includes a sand pile; at least one first conveyor; at least one ramp on which a vehicle may travel to provide sand from the vehicle to a receiving area of the at least one first conveyor; and at least one second conveyor disposed at least partially within the sand pile. The at least one first conveyor, when in operation, transports the sand at the receiving area to the sand pile. The at least one second conveyor, when in operation, transports sand from within the sand pile to outside the sand pile. Other aspects and features are also claimed and described.

22 Claims, 12 Drawing Sheets

WELLSITE PROPPANT STORAGE AND TRANSPORT SYSTEMS AND METHODS

CROSS-REFERENCE TO RELATED APPLICATION

This application is a continuation of U.S. patent application Ser. No. 19/299,722, filed Aug. 14, 2025, which is hereby incorporated by reference without disclaimer.

TECHNICAL FIELD

The present application relates generally to wellsite operations. More specifically, the present application provides systems and methods relating to the transportation to and storage of proppant, and/or the movement of proppant, at a wellsite.

BACKGROUND

Hydraulic fracturing operations are a well-known way of stimulating production from wells, especially oil and/or gas wells. Generally speaking, surface equipment is used to mix a hydraulic fracturing fluid that includes one or more liquids and potentially one or more gels mixed with a proppant. The hydraulic fracturing fluid (sometimes referred to as frac fluid) is pumped down a wellbore at a pressure sufficient to fracture reservoir rock that contains the oil and/or gas. A liquid component of the hydraulic fracturing fluid drains away to leave proppant residing in the hydraulically induced fractures. This creates a more permeable flow pathway capable of accelerating production of the oil and/or gas.

An example proppant is sand. Sand suppliers typically mine or quarry the sand, sort it by size, and dry the sand. The sand may then be placed into containers and loaded onto trucks or rail cars for transport to a wellsite where there is a need for the sand.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present disclosure provides new and innovative systems and methods for storing and transporting sand and/or other proppant material for hydraulic fracturing operations. The systems include an arrangement of conveyors in relation to a sand pile that allows for efficiently transporting sand from a vehicle to the sand pile for storage or from within the sand pile to outside the sand pile in preparation for hydraulic fracturing operations, or both.

In an example, a system includes a pile of proppant material (such as sand), at least one first conveyor, and at least one ramp on which a vehicle may travel to provide sand from the vehicle to a receiving area of the at least one first conveyor. The at least one first conveyor, when in operation, transports the sand at the receiving area to the sand pile. The system further includes at least one second conveyor disposed at least partially within the sand pile. The at least one second conveyor, when in operation, transports sand from within the sand pile to outside the sand pile. The sand pile may be not enclosed.

In an example, a system includes a pile of proppant material (such as sand), at least one first conveyor arranged such that, when in operation, the at least one first conveyor transports sand from a receiving area to the sand pile, and at least one second conveyor comprising a belt or screw disposed within an enclosure. At least a portion of the enclosure is disposed within the sand pile, and the at least one second conveyor, when in operation, transports sand from inside the sand pile to outside the sand pile. The sand pile may be not enclosed.

In an example, a system includes a pile of proppant material (such as sand), a first belt conveyor, a stacking conveyor, a second belt or screw conveyor (meaning a second belt conveyor or a second screw conveyor) disposed at least partially within the sand pile, and a third belt conveyor. The first belt conveyor, the stacking conveyor, the second belt or screw conveyor, and the third belt conveyor are arranged such that: the first belt conveyor, when in operation, transports first sand from a receiving area to the stacking conveyor, the stacking conveyer, when in operation, transports the first sand to the sand pile, the second belt or screw conveyor, when in operation, transports second sand from inside the sand pile to the third belt conveyor, and the third belt conveyor, when in operation, transports the second sand to an outlet chute of the third belt conveyor. The sand pile may be not enclosed.

The terms “a” and “an” are defined as one or more unless this disclosure explicitly requires otherwise. Herein, “or” is inclusive and not exclusive, unless expressly indicated otherwise or indicated otherwise by context. Therefore, herein, “A or B” means “A, B, or both,” unless expressly indicated otherwise or indicated otherwise by context. Moreover, “and” is both joint and several, unless expressly indicated otherwise or indicated otherwise by context. Therefore, herein, “A and B” means “A and B, jointly or severally,” unless expressly indicated otherwise or indicated otherwise by context.

The terms “comprise” and any form thereof such as “comprises” and “comprising,” “have” and any form thereof such as “has” and “having,” and “include” and any form thereof such as “includes” and “including” are open-ended linking verbs. As a result, an apparatus or system that “comprises,” “has,” or “includes” one or more elements possesses those one or more elements but is not limited to possessing only those elements. Likewise, a method that “comprises,” “has,” or “includes” one or more steps possesses those one or more steps but is not limited to possessing only those one or more steps.

Any embodiment of any of the systems and methods can consist of or consist essentially of—rather than comprise/have/include—any of the described steps, elements, and/or features. Thus, in any of the claims, the term “consisting of” or “consisting essentially of” can be substituted for any of the open-ended linking verbs recited above in order to change the scope of a given claim from what it would otherwise be using the open-ended linking verb.

A system that is configured in a certain way is configured in at least that way, but it can also be configured in other ways than those specifically described. Furthermore, reference in the appended claims to a system or a component of a system being arranged to or capable of performing a particular function encompasses that system, component, whether or not it or that particular function is activated, turned on, or unlocked, as long as that system, or component is so arranged or capable.

The feature or features of one embodiment may be applied to other embodiments, even though not described or illustrated, unless expressly prohibited by this disclosure or the nature of the embodiments. This extends to the claims, in that any claim that depends directly or indirectly from an independent claim may be amended to depend directly or indirectly from any other dependent claim that depends from the same independent claim.

Some details associated with the embodiments are described above and others are described below.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

A further understanding of the nature and advantages of the present disclosure may be realized by reference to the following drawings, or figures, in which similar components or features may have the same reference label. Further, various components of the same type may be distinguished by following the reference label with a second label that distinguishes among the similar components. If just the first reference label is used in the specification, the description is applicable to any one of the similar components having the same first reference label irrespective of the second reference label. Like reference numbers and designations in the various drawings indicate like elements.

DETAILED DESCRIPTION

Figure 1:
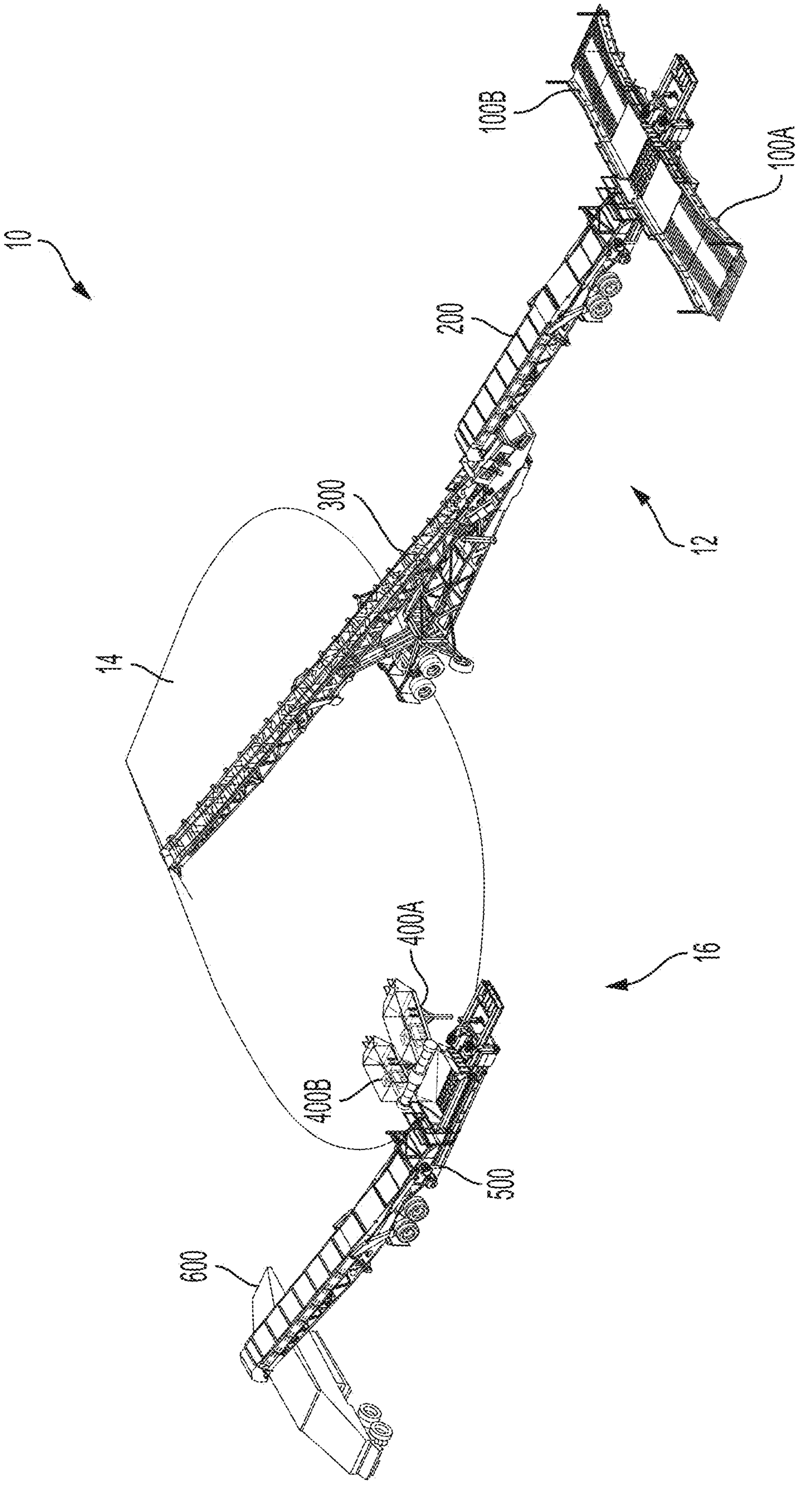
FIG. 1 illustrates a perspective view of a sand transport and storage system, according to an aspect of the present disclosure.

The detailed description set forth below, in connection with the appended drawings, is intended as a description of various configurations and is not intended to limit the scope of the disclosure to solely that described explicitly herein. Rather, the detailed description includes specific details for the purpose of providing a thorough understanding of the inventive subject matter. It will be apparent to those skilled in the art that these specific details are not required in every case and that well-known structures and components are not described for conciseness in the description.

Systems and methods are provided for storing and transporting sand at a wellsite. The sand may be used as a proppant in hydraulic fracturing operations. While the following description refers only to sand, the described systems and methods may be implemented for another suitable proppant. An example system includes an arrangement of conveyors in relation to a sand pile. In this example, to deliver sand to the sand pile for storage, sand may be discharged from a vehicle (including a compartment or container of the vehicle) onto a belt of an enclosed endless belt conveyor that transports the sand toward the sand pile (or an area on which a sand pile will be built). The endless belt conveyor discharges the sand onto a stacking conveyor that transports the sand up in elevation until the sand falls of the stacking conveyor onto the sand pile (or an area on which a sand pile will be built).

When the sand pile was formed, it was piled (at least partially) on top of one or more enclosed endless belt conveyors. The enclosures of the endless belt conveyors include at least one opening through which sand within the sand pile can fall onto the respective belts of these conveyors. The enclosure of at least one of these conveyors is disposed partially within the sand pile such that an outlet chute of the conveyor is disposed outside of the sand pile. If the sand pile was formed on top of more than one conveyor, then the enclosure of one or more of these conveyors may be disposed entirely within the sand pile. For example, a conveyor disposed entirely within the sand pile may transport sand from within the sand pile to a conveyor that has an outlet chute disposed outside the sand pile. With this arrangement of enclosed endless belt conveyors, sand from within the sand pile can be transported to outside the sand pile.

For example, the sand transported outside the sand pile may be discharged into another structure, such as a hopper (e.g., a surge hopper), which can be positioned above or otherwise be part of another enclosed endless belt conveyor. The discharged sand falls into the hopper and eventually onto the belt of this enclosed endless belt conveyor, which transports the sand to an outlet chute. The outlet chute may be directed toward a blender, and more specifically toward (e.g., positioned over) a tub of a blender, in some instances. The blender mixes the sand with other frac fluid constituents and discharges the mixture for use in hydraulic fracturing operations.

Referring now to FIG. 1, a system 10 is shown for storing sand in a sand pile 14 and transporting sand to and from sand pile 14. Sand pile 14 may be located at a wellsite and sand from sand pile 14 may be used as a proppant in hydraulic fracturing operations at the wellsite. Sand pile 14 need not be enclosed. In some implementations, sand pile 14 is not enclosed. In such implementations, sand pile 14 is exposed to the elements of an outside environment, such as rain and wind, and may be wet.

System 10 includes an arrival portion 12 that receives sand and transports it to sand pile 14, and a departure portion 16 that transports sand from within sand pile 14 to a point outside sand pile 14. In some implementations, arrival portion 12 or departure portion 16 may be omitted from system 10.

Arrival portion 12 includes at least one first conveyor that receives the sand and, when in operation, transports the sand to sand pile 14, such as to a top of sand pile 14, or to an area where the sand pile will be formed. For example, the at least one first conveyor may include a conveyor chain comprising a conveyor 200 and a conveyor 300. In this example, conveyor 200 receives sand and, when in operation, transports the sand to a receiving point of conveyor 300, which receives the sand from conveyor 200 and, when in operation, transports the sand to sand pile 14. In other examples, one of conveyor 200 or conveyor 300 may be omitted or one or more additional conveyors may be added to the conveyor chain. In some implementations, arrival portion 12 may include more than one conveyor chain that each receives sand and transports the respective sand to sand pile 14 (or to an area where the sand pile will be formed).

Arrival portion 12 also includes at least one ramp on which a vehicle may travel to provide sand from the vehicle to a receiving area 210 (FIG. 2A) of the at least one first conveyor. For example, the at least one ramp may include a ramp 100A and a ramp 100B. Ramp 100A may be disposed on one side of a receiving area 210 (FIG. 2A) of conveyor 200 and ramp 100B may be disposed on the other side. A vehicle may travel up ramp 100A, deliver sand to receiving area 210, and travel down ramp 100B along a continuous travel path, or vice versa. In some implementations, ramp 100A or 100B may be omitted. In such implementations, a vehicle may travel up a single ramp, deliver sand to receiving area 210, and travel down the single ramp.

Figure 7:
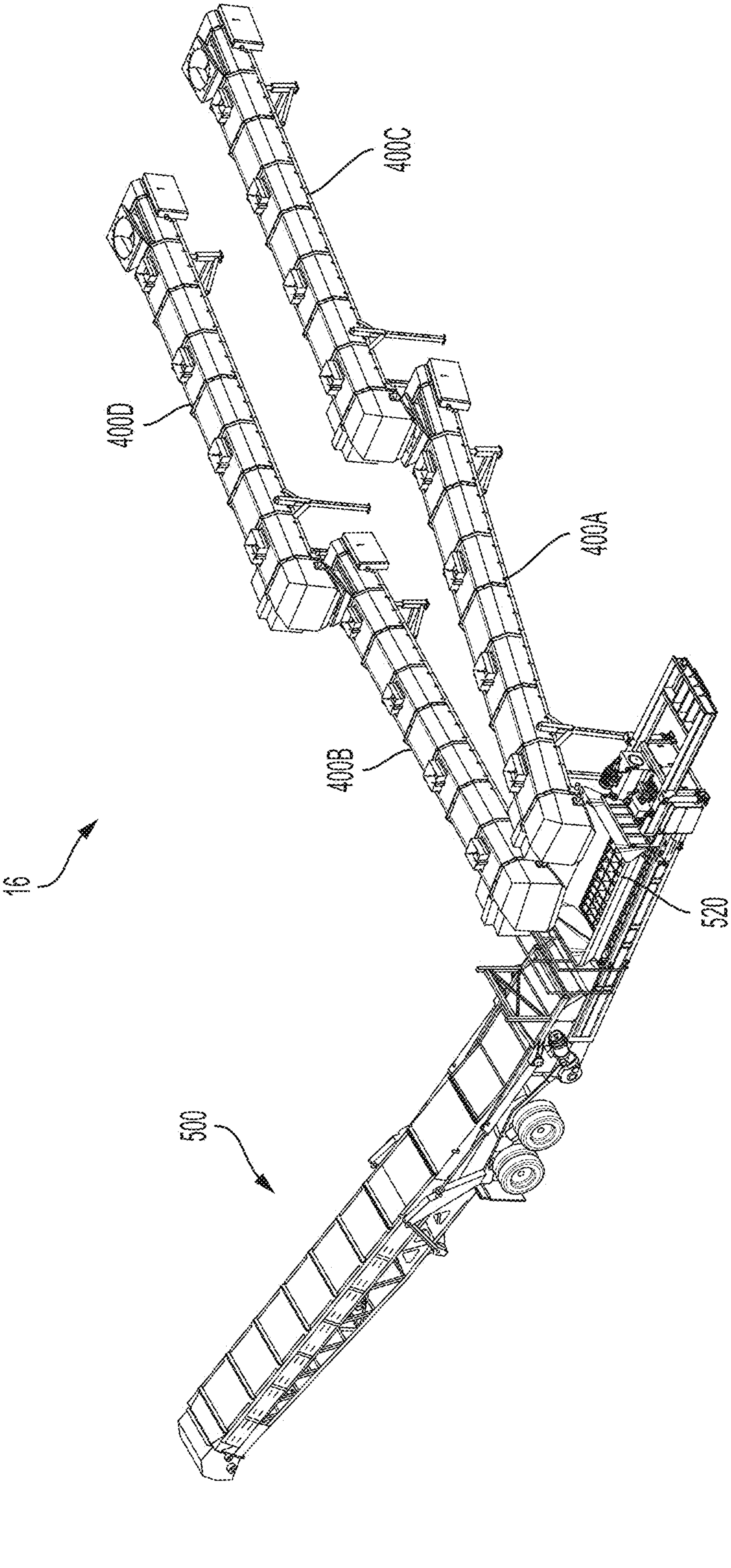
FIG. 7 illustrates a perspective view of a departure portion of the system of FIG. 1, according to an aspect of the present disclosure.

Departure portion 16 includes at least one second conveyor disposed at least partially within sand pile 14. The at least one second conveyor, when in operation, transports sand from within sand pile 14 to outside sand pile 14. For example, the at least one second conveyor may include a conveyor 400A, a conveyor 400B, a conveyor 400C (FIG. 7), and a conveyor 400D (FIG. 7). Conveyor 400A and conveyor 400B are each partially outside of sand pile 14, whereas conveyor 400C and conveyor 400D are each disposed entirely within sand pile 14 and therefore not visible in FIG. 1.

Departure portion 16 also includes at least one third conveyor that receives sand from the at least one second conveyor. For example, the at least one third conveyor may include a conveyor 500 that receives sand from conveyor 400A and conveyor 400B. Conveyor 500 may include or otherwise be positioned in operative relation to a surge hopper 520 (FIG. 7) positioned to receive the sand from conveyor 400A and conveyor 400B. When in operation, conveyor 500 transports the received sand to another point, such as a point at a greater elevation than surge hopper 520. For example, conveyor 500 may transport the sand so as to deliver the sand into a blender tub 600.

Figure 2:
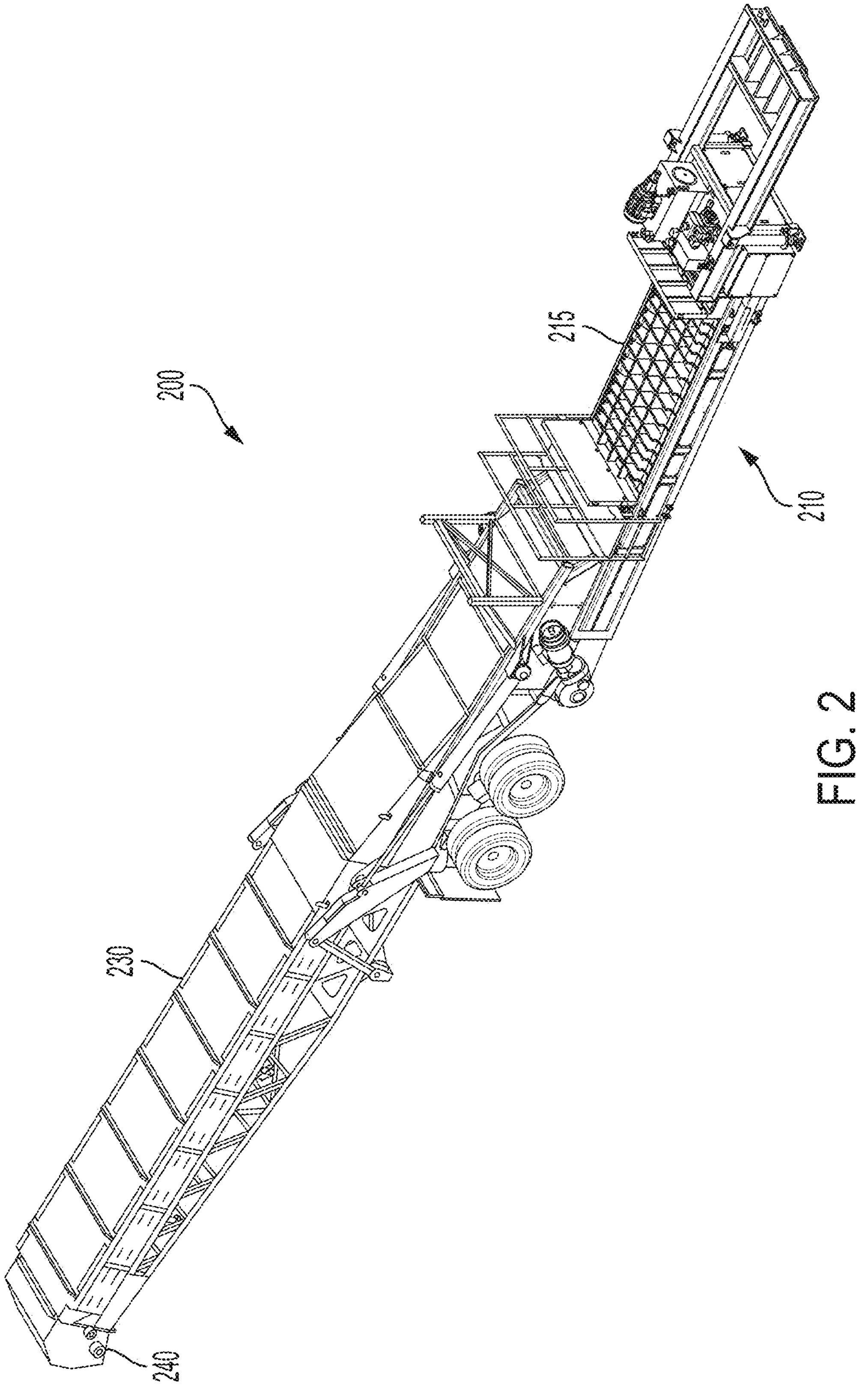
FIG. 2 illustrates a perspective view of a first conveyor in the arrival portion, according to an aspect of the present disclosure.
Figure 3:
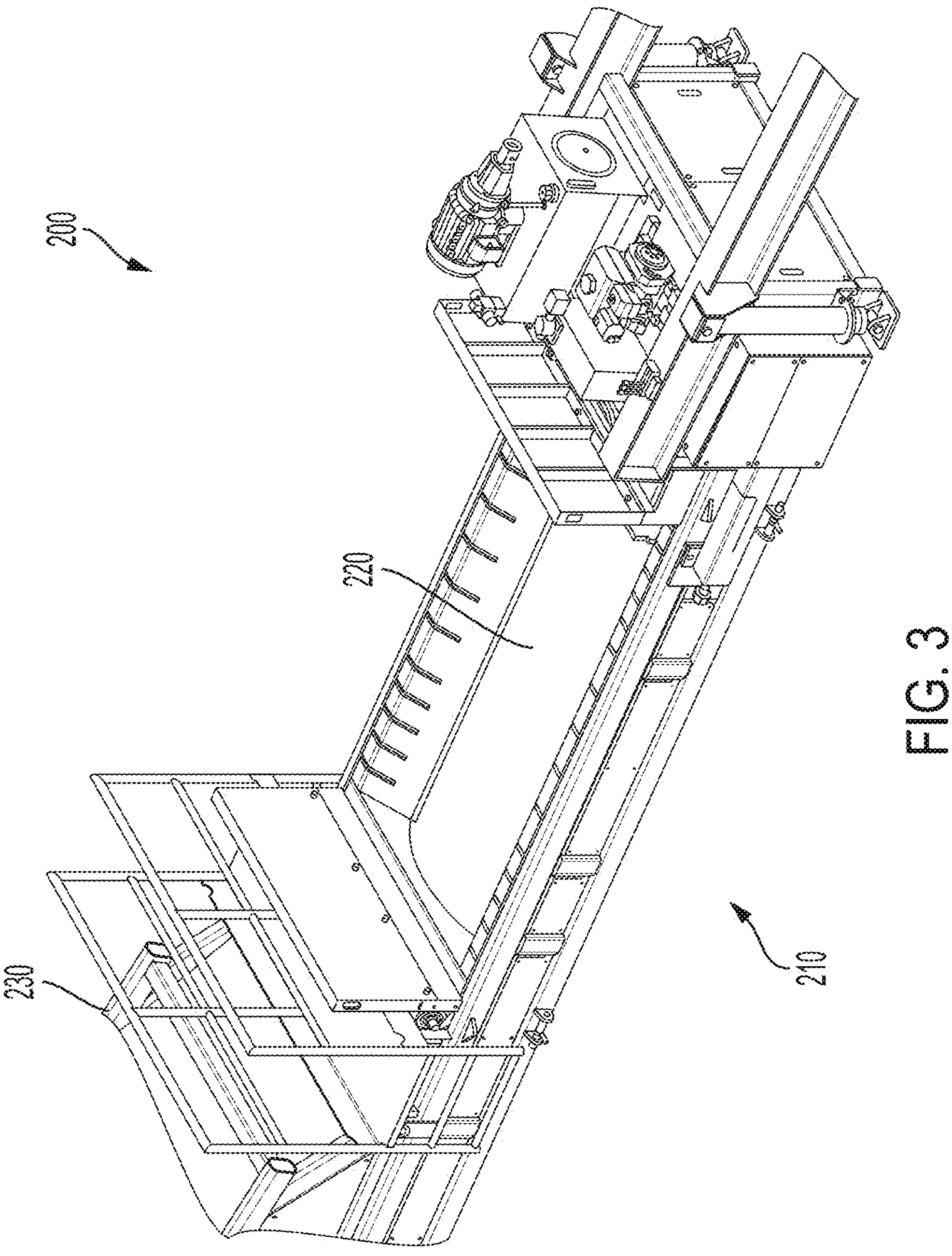
FIG. 3 illustrates a perspective view of a receiving area of the first conveyor with a belt of the first conveyor visible, according to an aspect of the present disclosure.

Referring now to FIGS. 2 and 3, conveyor 200 will be described in more detail. For conciseness, the components of conveyor 200 relevant to the description of the systems and methods provided herein are indicated with a reference numeral and described. The remaining components of conveyor 200 are well-understood. Conveyor 200 is an enclosed belt conveyor (e.g., an endless conveyor) that includes a belt 220 that is suitably wound around sheaves and idlers so as to travel a desired path within an enclosure. Belt 220 is driven (e.g., turned) by one or more motive mechanisms, such as an electric or hydraulic motor. In some implementations, conveyor 200 may be a type of conveyor other than a belt conveyor that is similarly capable of receiving sand at a first point and transporting the sand to a second point, which may be at a greater elevation than the first point.

Receiving area 210 of conveyor 200 includes at least one opening such that the sand provided to the receiving area flows through the at least one opening onto belt 220. For example, receiving area 210 may include a grate 215 having a plurality of openings. In this way, when sand is discharged from a vehicle into receiving area 210, the sand flows through grate 215 and onto belt 220. In some implementations, a hopper may be positioned directly below the grate 215. In such implementation, the hopper has an opening at a bottom thereof, which is positioned directly above belt 220.

Conveyor 200 includes an upwardly extending section 230 along the enclosure and belt 220, which are inclined. The end of upwardly extending section 230 of conveyor 200 opens to a chute 240. Chute 240 is disposed at a greater elevation than receiving area 210 due to upwardly extending section 230. When in operation, sand transported by belt 220 exits the enclosure through chute 240. Chute 240 can be directed toward a receiving area of conveyor 300 such that the sand that conveyor 200 transports is delivered to conveyor 300.

Figure 4A:
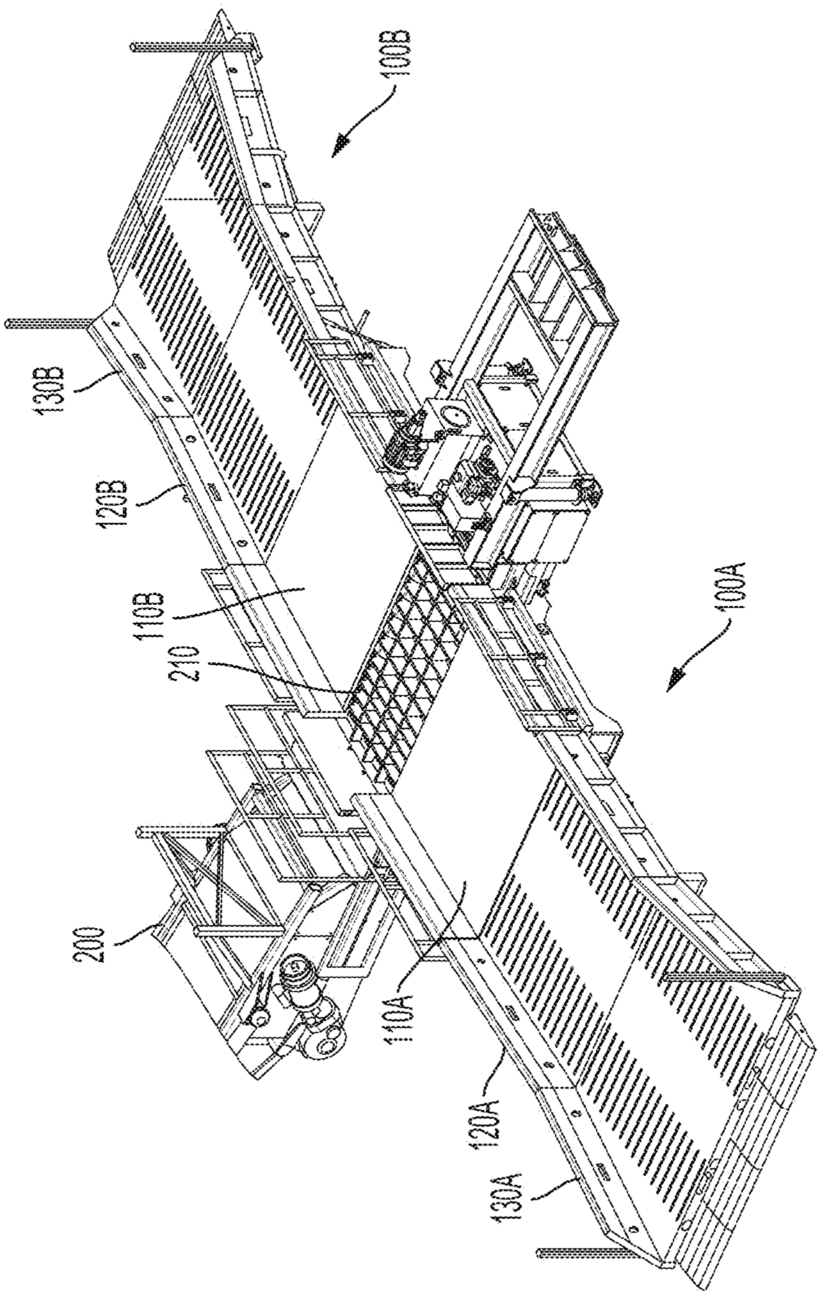
FIG. 4A illustrates a perspective view of a first state of an arrival portion of the system of FIG. 1, according to an aspect of the present disclosure.
Figure 4B:
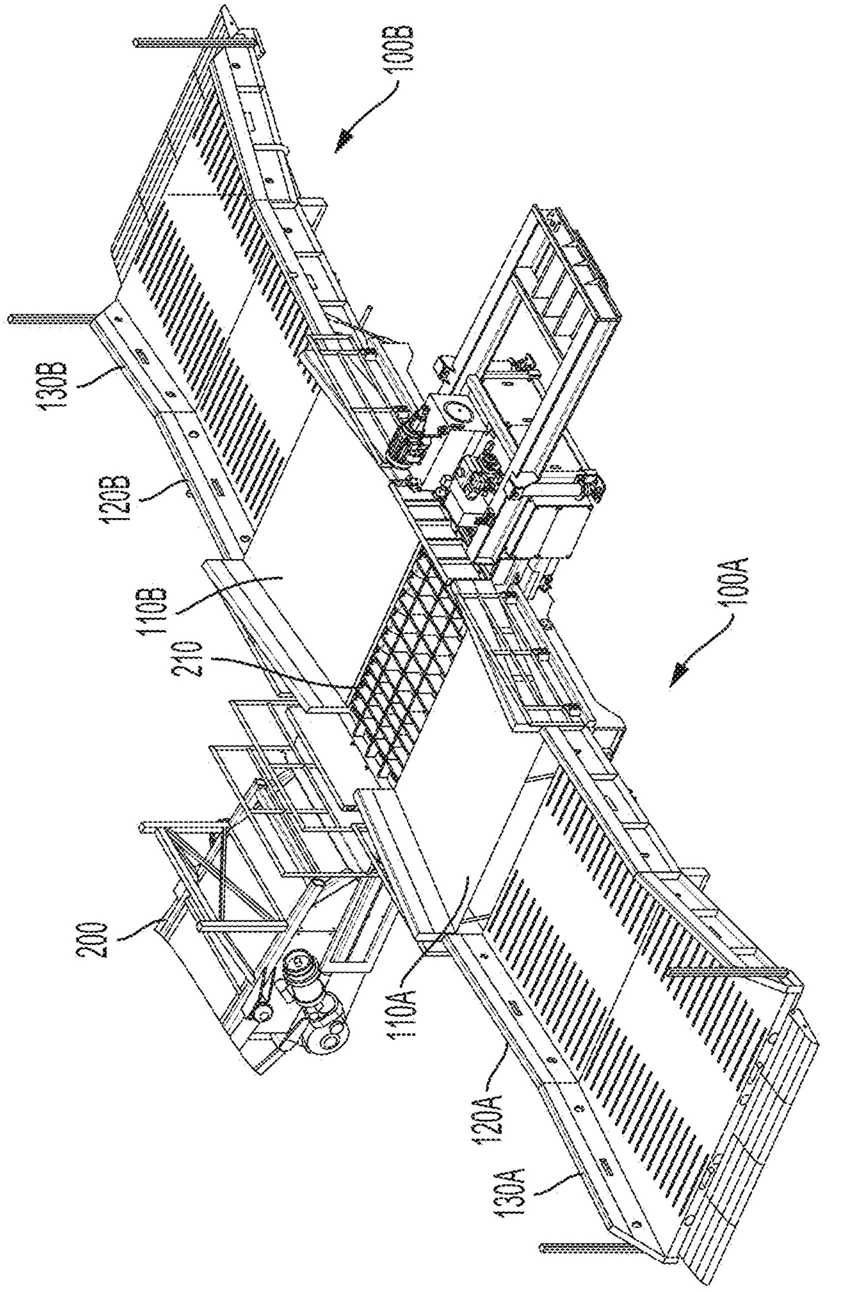
FIG. 4B illustrates a perspective view of a second state of the arrival portion of the system of FIG. 1, according to an aspect of the present disclosure.
Figure 5:
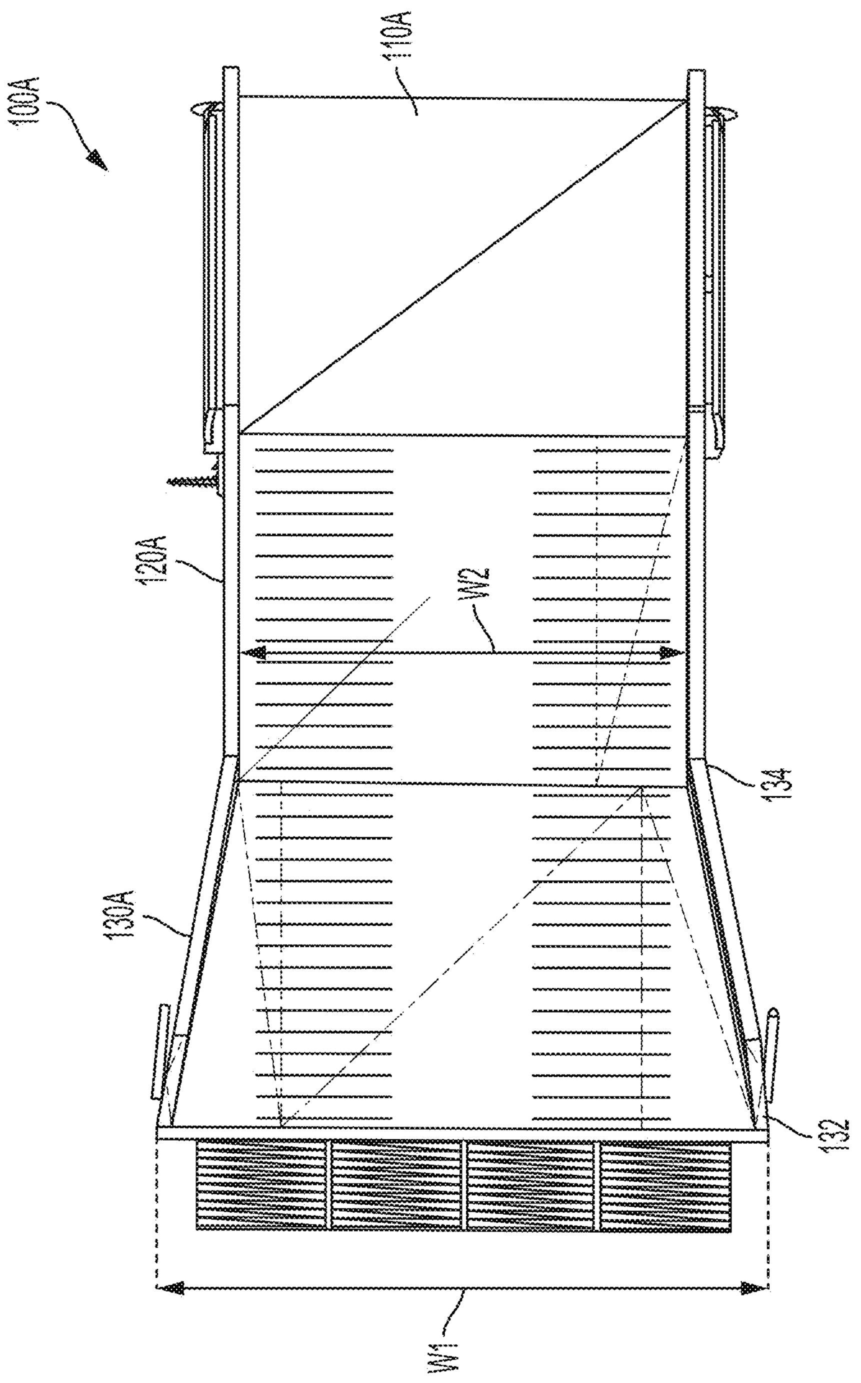
FIG. 5 illustrates a top view of a ramp of the arrival portion, according to an aspect of the present disclosure.

Referring now to FIGS. 4A, 4B, and 5, ramp 100A will be described in more detail. The description of ramp 100A may apply to ramp 100B as well. Ramp 100A includes a pivoting portion 110A and a flared portion 130A. A middle portion 120A may extend between pivoting portion 110A and flared portion 130A. In some implementations, pivoting portion 110A, middle portion 120A, and flared portion 130A may be distinct components that are connected to one another. In other implementations, pivoting portion 110A, middle portion 120A, and flared portion 130A may be portions of a single component.

Pivoting portion 110A includes an actuatable mechanism that, when actuated, pivots pivoting portion 110A such that pivoting portion 110A is inclined toward receiving area 210. For example, FIG. 4A shows pivoting portion 110A in a first state in which a vehicle may travel over pivoting portion 110A. For example, pivoting portion 110A may be flush with the middle portion in the first state. When the actuatable mechanism of pivoting portion 110A is actuated, pivoting portion 110A is pivoted to a second state shown in FIG. 4B in which pivoting portion 110A is inclined toward receiving area 210. In the second state, sand that is on pivoting portion 110A, such as sand discharged from a vehicle that missed receiving area 210 or that otherwise blew or was scattered onto pivoting portion 110A, can be funneled into receiving area 210 and onto belt 220 so that the sand is transported to sand pile 14. FIG. 4B shows pivoting portion 110B of ramp 110B in the second state as well.

The actuatable mechanism of pivoting portion 110A includes one or more actuators that may actuate at least one cylinder, such as a hydraulic or pneumatic cylinder. For example, the at least one cylinder includes a cylinder 112A and a cylinder 112B. Additional cylinders may be provided in some implementations.

The actuator(s) may be actuated manually by an operator or automatically. For example, an operator may press a button on a control panel or wireless device. In another example, ramp 100A, ramp 100B, or conveyor 200 may include one or more sensors that detect when a vehicle has discharged sand in receiving area 210 and traveled off of ramps 100A, 100B. For example, the one or more sensors may include one or more of weight sensors, proximity sensors, motion sensors, or other suitable sensors. Upon this detection by the one or more sensors, a signal may be transmitted by the one or more sensors that (directly or indirectly) causes the actuator(s) to actuate the cylinders 112A, 112B of one or both of ramps 100A, 100B. In this way, sand left on pivoting portions 110A and/or 110B after the vehicle has left can be automatically funneled onto belt 220 without manual intervention from an operator.

As shown in FIG. 5, flared portion 130A of ramp 100A is flared such that a width W1 of the end 132 of flared portion 130A is greater than a width W2 of middle portion 120A. The end 134 of flared portion 130A has a width equal to width W2 as well. The flared nature of flared portion 130A allows a driver to more easily turn a vehicle onto ramp 100A. For instance, the vehicle does not have to be maneuvered so that it travels toward ramp 100A in a direction perpendicular to the width direction of ramp 100A, but rather has more clearance. Making it easier to drive a vehicle onto ramp 100A can increase efficiency of discharging the sand from the vehicle into receiving area 210 of conveyor 200 and driving on to the next task for the vehicle. The ease of driving onto ramp 100A can also reduce the space that is needed when driving the vehicle onto ramp 100A.

The flared nature of flared portion 130A also allows a vehicle to be more quickly turned off of ramp 100A. Rather than having to travel all of the way off ramp 100A prior to turning, a vehicle can be turned while the vehicle is still partially on ramp 100A. The quicker turning can increase efficiency of discharging the sand from the vehicle into receiving area 210 of conveyor 200 and driving on to the next task for the vehicle. The quicker turning can also reduce the space that is needed when driving the vehicle off of ramp 100A.

Figure 6:
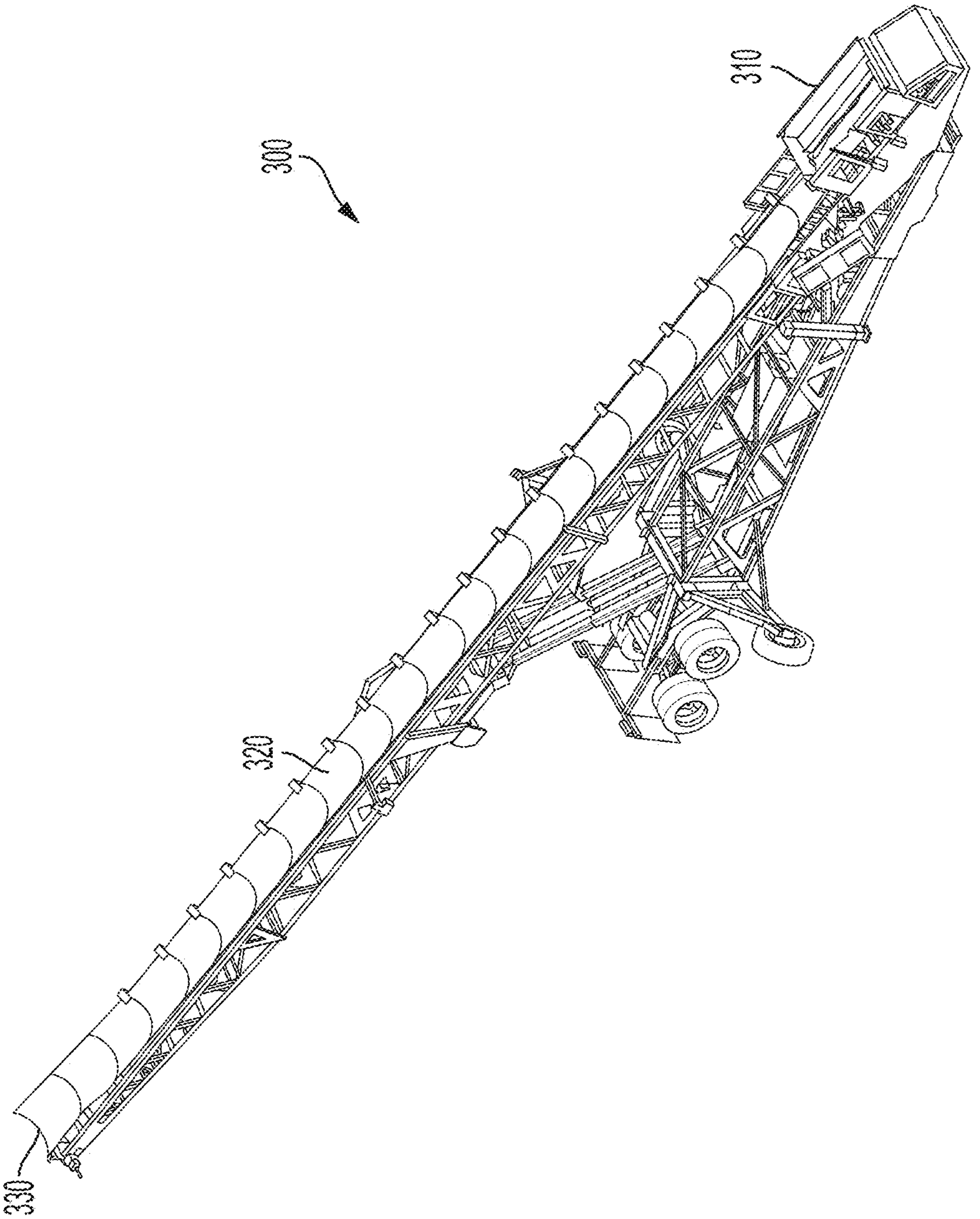
FIG. 6 illustrates a perspective view of a second conveyor in the arrival portion, according to an aspect of the present disclosure.

Referring now to FIG. 6, conveyor 300 will be described in more detail. For conciseness, the components of conveyor 300 relevant to the description of the systems and methods provided herein are indicated with a reference numeral and described. The remaining components of conveyor 300 are well-understood. Conveyor 300 is a stacking conveyor, which is a specialized type of conveyor designed for efficiently stockpiling bulk materials. In some implementations, conveyor 300 may be a radial stacking conveyor that has the ability to rotate in an arc, allowing for a wider and more evenly distributed stockpile.

Conveyor 300 includes a belt 320. Belt 320 may be suitably wound around sheaves and idlers so as to travel a desired path. Belt 320 is driven (e.g., turned) by one or more motive mechanisms, such as an electric or hydraulic motor. Sand is received at a receiving area 310 of (or that is positioned in operative relation to) conveyor 300 and flows onto belt 320. In some implementations, receiving area 310 may include a hopper with an opening at a bottom thereof that is positioned directly above belt 320. With conveyor 300 in operation, sand is thereafter transported on belt 320 to an end 330 of conveyor 300, off which sand falls onto sand pile 14. Conveyor 300 is inclined such that end 330 is at a greater elevation than receiving area 310. The angle at which conveyor 300 is inclined may be adjustable. In some implementations, conveyor 300 may be a type of conveyor other than a stacking conveyor that is similarly capable of receiving sand at a first point and transporting the sand to a second point that is at an elevation greater than the first point.

Referring now to FIG. 7, an embodiment of departure portion 16 is seen in full. Specifically, sand pile 14 is removed so that each of conveyors 400A, 400B, 400C, and 400D can be seen. In the depicted arrangement, conveyor 400C transports sand from within sand pile 14 to conveyor 400A, which transports the sand to surge hopper 520. Similarly, conveyor 400D transports sand from within sand pile 14 to conveyor 400B, which transports the sand to surge hopper 520. In an implementation of departure portion 16 of system 10, conveyors 400A, 400B, 400C, and 400D are positioned where sand pile 14 is to be formed, and sand is piled on top of conveyors 400A, 400B, 400C, and 400D to build sand pile 14. In some implementations, one or more of conveyors 400B, 400C, or 400D may be omitted, or additional conveyors may be added.

Figure 8:
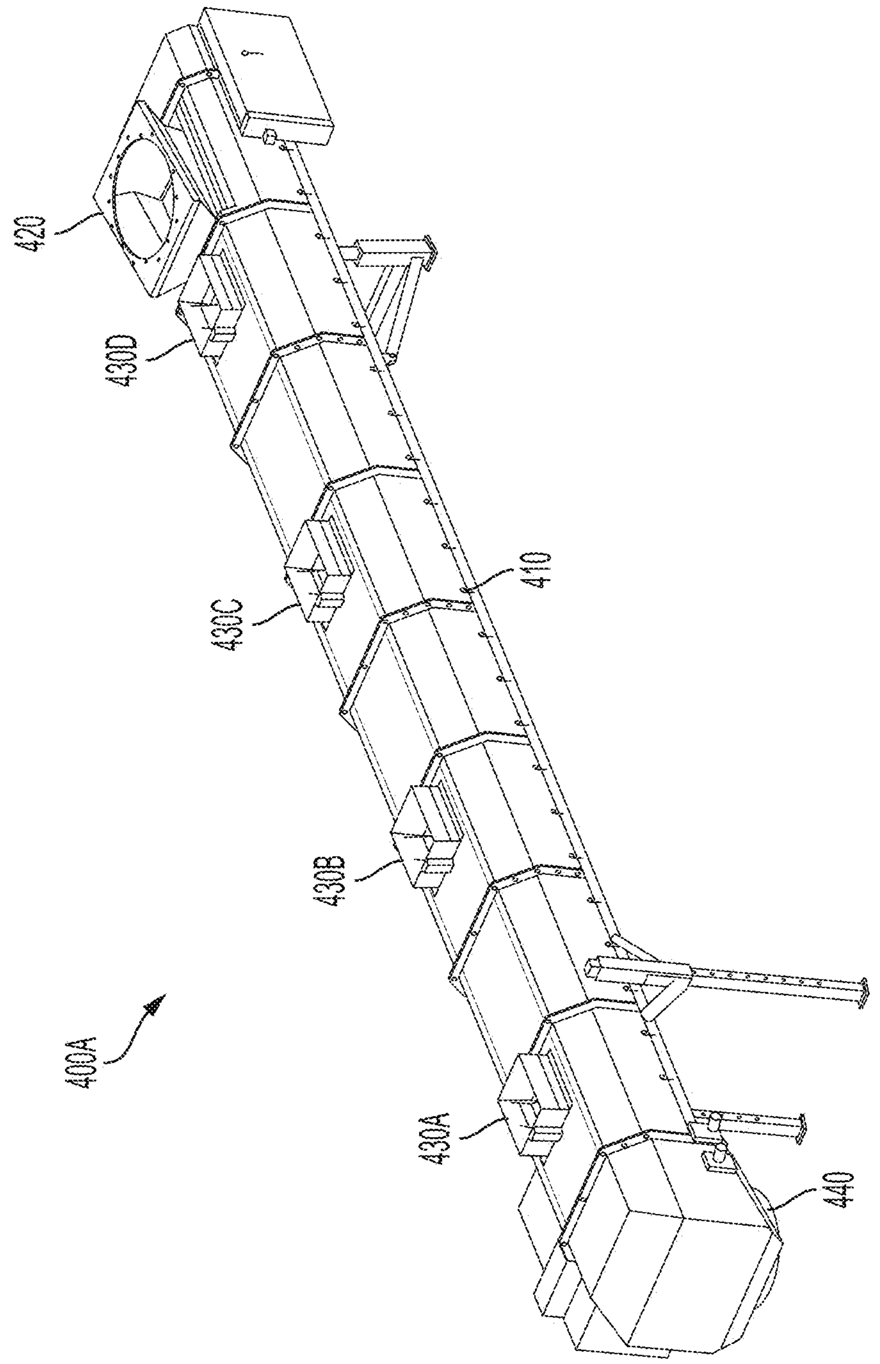
FIG. 8 illustrates a perspective view of a conveyor of the departure portion, according to an aspect of the present disclosure.

Conveyor 400A will now be described in further detail with reference to FIGS. 7 and 8. The description of conveyor 400A applies to each of conveyors 400B, 400C, and 400D as well, unless stated otherwise. For conciseness, the components of conveyor 400A relevant to the description of the systems and methods provided herein are indicated with a reference numeral and described. The remaining components of conveyor 400A are well-understood.

Conveyor 400A is an enclosed conveyor. For example, conveyor 400A may be an enclosed belt conveyor (e.g., an endless conveyor) that includes a belt (not shown) that is suitably wound around sheaves and idlers so as to travel a desired path within an enclosure 410. The belt of conveyor 400A is not shown, but will be understood to be similar to belt 220 of conveyor 200. The belt of conveyor 400A is driven (e.g., turned) by one or more motive mechanisms, such as an electric or hydraulic motor.

A receiving area 420 of conveyor 400A is disposed at one end of enclosure 410. Sand may flow through receiving area 420 onto the belt. For example, sand discharged from conveyor 400C may flow through receiving area 420 and onto the belt. In some implementations, receiving area 420 may include a hopper with an opening at a bottom thereof that is positioned directly above the belt. Enclosure 410 also includes multiple inlets 430A, 430B, 430C, and 430D through which sand may flow onto the belt. In some implementations, one or more of inlets 430A, 430B, 430C, and 430D may include a hopper with an opening at a bottom thereof that is positioned directly above the belt.

Enclosure 410 is partially disposed within sand pile 14 (e.g., FIG. 1) such that each of receiving area 420 and inlets 430A, 430B, 430C, and 430D are disposed within sand pile 14. In this way, sand from within sand pile 14 can fall through one or more of receiving area 420 or inlets 430A, 430B, 430C, or 430D and onto the belt. As sand is removed by conveyor 400A, gravity causes sand in sand pile 14 to shift and fill in the spaces where the sand that falls onto the belt of conveyor 400A used to be.

Enclosure 410 opens to a chute 440 at an end of conveyor 400A opposite receiving area 420. Chute 440 and a portion of enclosure 410 proximate chute 440 are disposed outside sand pile 14. In this way, conveyor 400A can transport sand from within sand pile 14 to outside sand pile 14. When conveyor 400A is in operation, sand on the belt is transported to chute 440 through which the sand is discharged. Chute 440 can be directed toward a surge hopper 520, such as one of (or positioned in operative relation to) conveyor 500. In some implementations, chute 440 may be disposed at a greater elevation than receiving area 420. In some implementations, conveyor 400A may be a type of conveyor other than a belt conveyor that is similarly capable of receiving sand at a first point and transporting the sand to a second point, which may be at a greater elevation than the first point.

Figure 11:
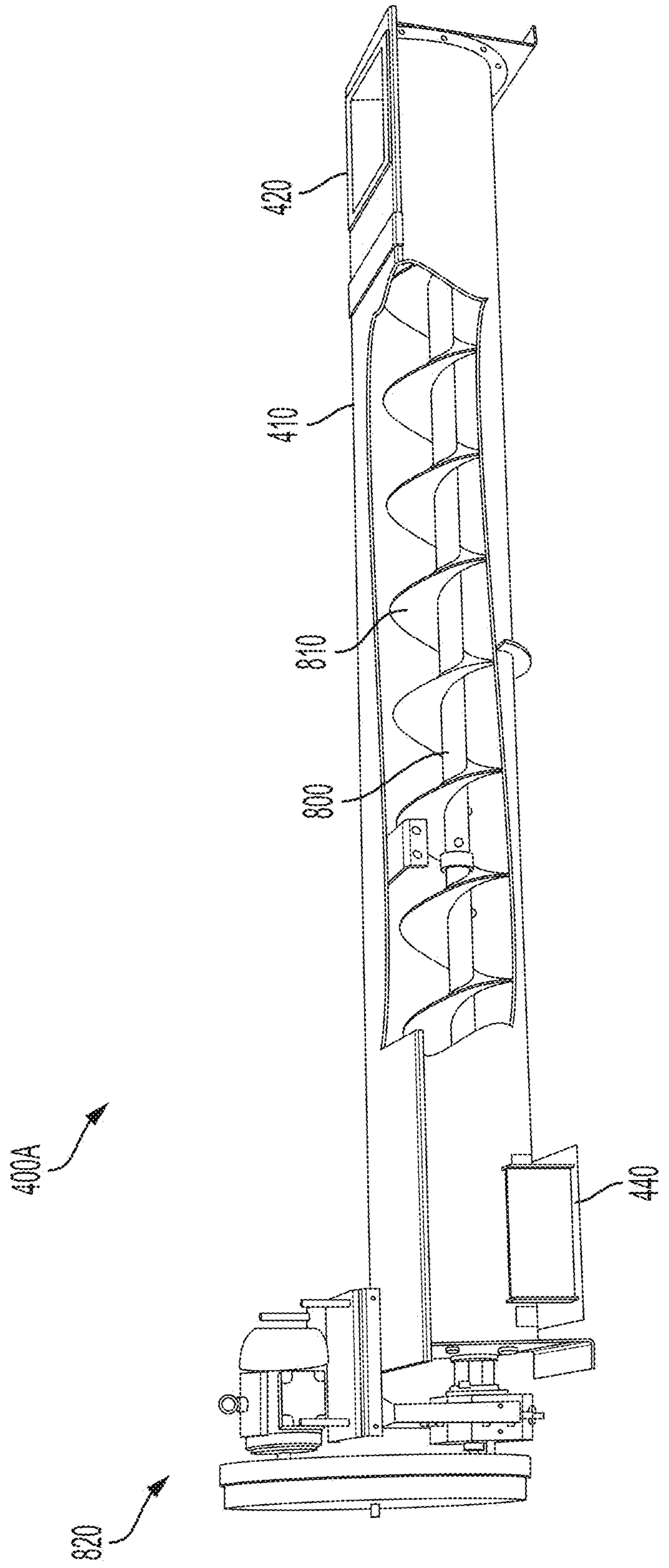
FIG. 11 illustrates a perspective view of a screw conveyor, according to an aspect of the present disclosure.

While conveyor 400A has been referred to, and will continue to be referred to, as an enclosed belt conveyor, conveyor 400A may include a different type of conveyor within enclosure 410. For example, conveyor 400A may be an enclosed screw conveyor. FIG. 11 illustrates an example implementation in which conveyor 400A is an enclosed screw conveyor. A portion of enclosure 410 is shown removed to reveal the rotating screw (e.g., auger) 800 within. The rotating screw 800 includes a shaft and a thread 810 spiraling along the shaft. As the rotating screw 800 turns, it pushes material (e.g., sand) received at receiving area 420 towards chute 440. One or more motive mechanisms 820, such as an electric or hydraulic motor, may drive rotation of the rotating screw 800. Similar to the illustrated belt conveyor implementation of conveyor 400A, the enclosure 410 of the screw conveyor implementation may include one or more inlets (not shown) like inlets 430A, 430B, 430C, or 430D and/or may be elevated and/or inclined by supports, like those shown in, e.g., FIG. 8.

Returning to FIG. 7, conveyors 400C and 400D differ from conveyor 400A in system 10 in that the enclosures of conveyors 400C and 400D are entirely disposed within sand pile 14. With this arrangement, the respective chutes of conveyors 400C and 400D are disposed within sand pile 14 and are directed toward the respective receiving areas of conveyors 400A and 400B. By transporting sand from within sand pile 14 with conveyor 400C to conveyor 400A, and transporting the sand with conveyor 400A to discharge out chute 440, conveyors 400C and 400A together transport sand from within sand pile 14 to outside sand pile 14. The same applies to conveyors 400D and 400B.

Figure 9:
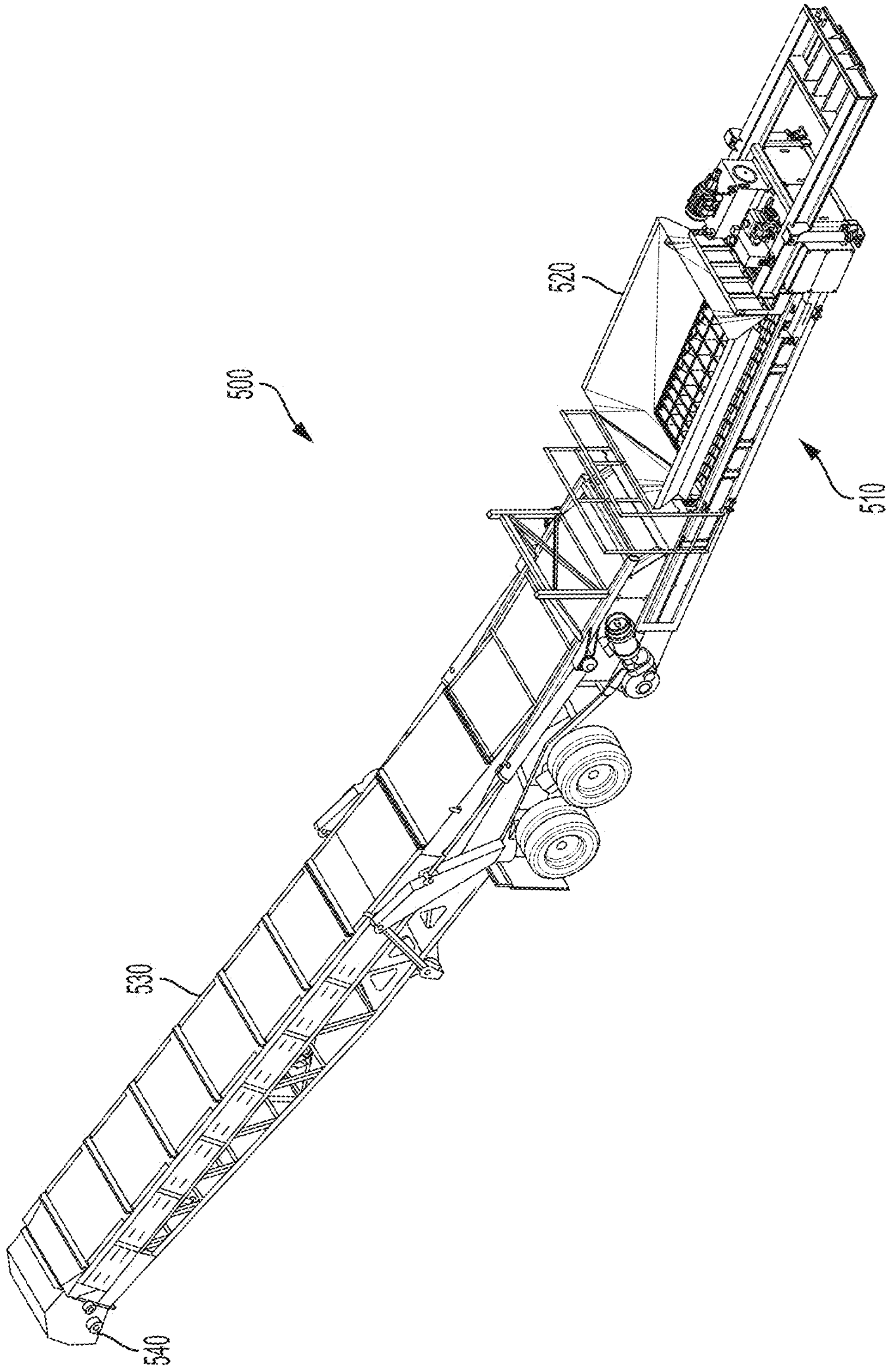
FIG. 9 illustrates a perspective view of a conveyor of the departure portion, according to an aspect of the present disclosure.

Referring now to FIG. 9, conveyor 500 includes a receiving area 510 that includes surge hopper 520. Sand discharged into surge hopper 520, such as from conveyors 400A and 400B, flows onto a belt of conveyor 500. When in operation, the belt transports the sand through the upwardly extending portion 530 and out a chute 540. The description of conveyor 500 differs from that of conveyor 200 in that the receiving area 510 of conveyor 500 includes surge hopper 520, and therefore the remaining description will not be repeated. In some embodiments, surge hopper 520 may be positioned as shown, such that it is located in operative relation to conveyor 500 but is not part of conveyor 500.

In some implementations, chute 540 may be directed toward blender tub 600. Surge hopper 520 (or, more specifically, the portion of the belt of conveyor 500 beneath surge hopper 520) and blender tub 600 may exist at different elevations such that the sand discharged into surge hopper 520 needs to ascend for delivery into the blender tub 600. In such implementations, upwardly extending portion 530 imparts the elevation increase between the belt portion beneath surge hopper 520 and blender tub 600. The blender that includes blender tub 600 mixes wet sand from sand pile 14 with frac fluid constituents and discharges the mixture for use in hydraulic fracturing operations.

In system 10, conveyors 200, 300, 400A-400D, and 500 may be controlled individually or as a group by one or more controllers that may be in wired or wireless communication with the conveyors. One or more of the conveyors may be equipped with one or more sensors that detect and transmit information signals to the one or more controllers. For example, a conveyor may be equipped with a load sensor that provides signals indicating or otherwise representative of (such as through a calculation or derivation) the weight of the sand on the conveyor. These signals may emanate, for example, from load scales on a motive mechanism. Load scales for these belts are alternatively known as conveyor scales or belt scales. The one or more controllers may control operations of the one or more of the conveyors based at least in part on the signals received from (or pulled from) the one or more sensors.

Figure 10:
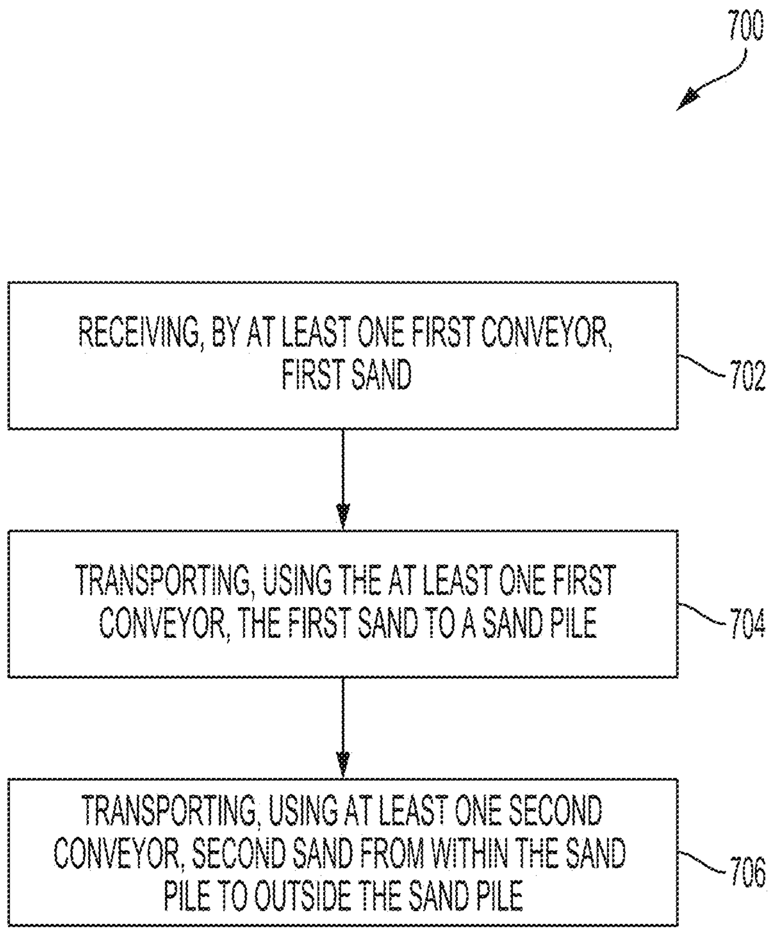
FIG. 10 is a flow chart of a method of managing a sand pile, according to an aspect of the present disclosure.

Various methods of transporting and storing sand may be realized by using the implementations of system 10 encompassed by the description above. FIG. 10 is a flow chart depicting an example of one such method. At 702, method 700 includes receiving, by at least one first conveyor, first sand. For example, the at least one first conveyor may be conveyor 200. In another example, the at least one first conveyor may be conveyor 300. In another example, the at least one first conveyor may be both conveyor 200 and conveyer 300. The first sand received by the at least one conveyor may be received from a vehicle.

At 704, the first sand is transported to a sand pile (e.g., sand pile 14) using the at least one first conveyor. For example, conveyor 200 may transport the first sand to conveyor 300, and conveyor 300 transports the first sand to sand pile 14.

At 706, second sand from within sand pile 14 is transported using at least one second conveyor to outside sand pile 14. For example, the at least one second conveyor may be conveyor 400A. In another example, the at least one second conveyor may be conveyor 400A and conveyor 400B. In another example, the at least one second conveyor may be conveyor 400A, conveyor 400B, and conveyor 400C. In another example, the at least one second conveyor may be conveyor 400A, conveyor 400B, conveyor 400C, and conveyor 400D.

In some aspects of method 700, transporting the second sand using the at least one second conveyor includes transporting the second sand to a third conveyor. The third conveyor may be, for example, conveyor 500. In some aspects, method 700 may further include transporting the second sand using the third conveyor to a blender, such as a tub of a blender.

It is noted that the order of one or more blocks (or operations) described with reference to FIG. 10 may be changed, certain blocks may be combined with other blocks, additional blocks may be added, and some of the block may be omitted.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the products, systems, and methods are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A system comprising:
- a sand pile;
- at least one first conveyor;
- at least one ramp on which a vehicle may travel to provide sand from the vehicle to a receiving area of the at least one first conveyor, wherein the at least one first conveyor, when in operation, transports the sand at the receiving area to the sand pile; and
- at least one second conveyor disposed at least partially within the sand pile, wherein the at least one second conveyor, when in operation, transports sand from within the sand pile to outside the sand pile.

2. The system of claim 1, further comprising at least one third conveyor comprising—or positioned in operative relation to—a surge hopper, wherein the surge hopper is positioned to receive the sand transported by the at least one second conveyor to outside the sand pile.

3. The system of claim 2, wherein the at least one third conveyor includes a belt conveyor that, when in operation, transports the sand received in the surge hopper to an outlet chute of the at least one third conveyor.

4. The system of claim 3, wherein the belt conveyor is inclined such that the outlet chute is disposed at a height that enables sand exiting the outlet chute to be delivered into a blender tub.

5. The system of claim 1, wherein the at least one first conveyor includes a belt conveyor, and the receiving area includes at least one opening such that the sand provided to the receiving area flows through the at least one opening onto a belt of the belt conveyor.

6. The system of claim 1, wherein:
- the at least one first conveyor includes a belt conveyor and a stacking conveyor;
- the belt conveyor, when in operation, transports the sand at the receiving area to an outlet chute of the belt conveyor;
- the outlet chute of the belt conveyor is arranged such that the sand exiting the outlet chute of the belt conveyor is delivered to an inlet of the stacking conveyor; and
- the stacking conveyor, when in operation, transports the sand at the inlet of the stacking conveyor to the sand pile.

7. The system of claim 1, wherein the at least one ramp includes a first ramp on a first side of the at least one first conveyor and a second ramp on a second side of the at least one first conveyor such that a continuous travel path is formed along the first and second ramps.

8. The system of claim 1, wherein the at least one ramp includes a flared end such that a width of the flared end is greater than a width of a central portion of the at least one ramp.

9. The system of claim 1, wherein the at least one ramp includes an actuatable mechanism that, when in operation, pivots a portion of the at least one ramp such that the portion is inclined toward the receiving area.

10. The system of claim 1, wherein the at least one second conveyor includes:
- a belt conveyor comprising a belt disposed within an enclosure, or
- a screw conveyor comprising a screw disposed within the enclosure; and
- wherein the enclosure includes a plurality of inlets that allow sand within the sand pile to pass through onto the belt or the screw.

11. A system comprising:
- a sand pile;
- at least one first conveyor arranged such that, when in operation, the at least one first conveyor transports sand from a receiving area to the sand pile; and
- at least one second conveyor comprising a belt or screw disposed within an enclosure, wherein at least a portion of the enclosure is disposed within the sand pile, and wherein the at least one second conveyor, when in operation, transports sand from inside the sand pile to outside the sand pile.

12. The system of claim 11, further comprising at least one third conveyor comprising—or positioned in operative relation to—a surge hopper, wherein the surge hopper is positioned to receive the sand transported by the at least one second conveyor to outside the sand pile.

13. The system of claim 12, wherein the at least one third conveyor is inclined such that an outlet chute of the at least one third conveyor is disposed at a height that enables sand exiting the outlet chute to be delivered into a blender tub.

14. The system of claim 11, wherein the at least one first conveyor, when in operation, transports the sand from the receiving area to a top of the sand pile.

15. The system of claim 11, further comprising at least one third conveyor comprising a second belt disposed within a second enclosure, wherein the second enclosure is disposed entirely within the sand pile, and wherein the at least one third conveyor, when in operation, transports sand from inside the sand pile to the at least one second conveyor.

16. A system comprising:
- a sand pile;
- a first belt conveyor;
- a stacking conveyor;
- a second belt or screw conveyor disposed at least partially within the sand pile; and
- a third belt conveyor,
- wherein the first belt conveyor, the stacking conveyor, the second belt or screw conveyor, and the third belt conveyor are arranged such that:
  - the first belt conveyor, when in operation, transports first sand from a receiving area to the stacking conveyor;
  - the stacking conveyer, when in operation, transports the first sand to the sand pile;
  - the second belt or screw conveyor, when in operation, transports second sand from inside the sand pile to the third belt conveyor; and
  - the third belt conveyor, when in operation, transports the second sand to an outlet chute of the third belt conveyor.

17. The system of claim 16, further comprising:
- a first ramp disposed on a first side of the first belt conveyor; and
- a second ramp disposed on a second side of the second belt conveyor such that a vehicle can travel a continuous travel path over the first ramp and the second ramp.

18. The system of claim 17, wherein the receiving area is disposed between the first ramp and the second ramp.

19. The system of claim 16, further comprising a fourth belt or screw conveyor disposed entirely within the sand pile and arranged such that the fourth belt or screw conveyor, when in operation, transports the second sand from inside the sand pile to the second belt or screw conveyor.

20. The system of claim 16, wherein the sand pile is not enclosed.

21. A method comprising:

receiving first sand by a first conveyor;

transporting the first sand using at least the first conveyor to a sand pile;

transporting second sand from within the sand pile to outside the sand pile using at least a second conveyor;

transporting the second sand to a hopper positioned above a third conveyor; and transporting the second sand using at least the third conveyor.

22. The method of claim 21, wherein:

the first sand is received by the first conveyor after pivoting a ramp portion on which the first sand is located.

* * * * *